US007802752B2

United States Patent
Papamoschou

(12) United States Patent
(10) Patent No.: US 7,802,752 B2
(45) Date of Patent: Sep. 28, 2010

(54) JET ENGINE NOISE SUPPRESSOR

(75) Inventor: Dimitri Papamoschou, Mission Viejo, CA (US)

(73) Assignee: The Regents of the University of California, Oakland, CA (US)

( * ) Notice: Subject to any disclaimer, the term of this patent is extended or adjusted under 35 U.S.C. 154(b) by 942 days.

(21) Appl. No.: 11/648,094

(22) Filed: Dec. 29, 2006

(65) Prior Publication Data

US 2007/0107414 A1 May 17, 2007

Related U.S. Application Data

(63) Continuation-in-part of application No. 10/393,173, filed on Mar. 20, 2003, now Pat. No. 7,293,401.

(60) Provisional application No. 60/366,379, filed on Mar. 20, 2002.

(51) Int. Cl.
*B64D 33/00* (2006.01)

(52) U.S. Cl. .......................... 244/1 N; 244/54; 60/262; 60/264; 239/265.19; 181/220

(58) Field of Classification Search .................. 244/54, 244/73 R, 1 N, 53 R; 60/226.1, 262, 264, 60/770; 239/265.19; 181/213, 220
See application file for complete search history.

(56) References Cited

U.S. PATENT DOCUMENTS 4,466,587 A * 8/1984 Dusa et al. ................. 244/121
6,820,410 B2 * 11/2004 Lair ........................... 60/204

* cited by examiner

*Primary Examiner*—Timothy D Collins
(74) *Attorney, Agent, or Firm*—Blakely Sokoloff Taylor & Zafman

(57) ABSTRACT

An embodiment of the invention is a technique to suppress noise in a jet engine. A substantially annular fan nozzle is attached to a pylon and discharges a fan stream into atmosphere from an aft end thereof. A core nozzle discharges core stream into the atmosphere. The core nozzle has an exterior surface. A stream director is mounted on the pylon to direct the fan stream away from the pylon. At least a portion of the stream director is situated outside the aft end to maintain substantially constant flow area of the fan nozzle.

45 Claims, 10 Drawing Sheets

JET ENGINE NOISE SUPPRESSOR

This patent application is a continuation-in-part of the Patent application titled "Jet Engine Noise Suppressor", Ser. No. 10/393,173, filed on Mar. 20, 2003 now U.S. Pat. No. 7,293,401 which claims the benefit of the provisional application, titled "Jet Engine Noise Suppressor", filed on Mar. 20, 2002, Ser. No. 60/366,379.

This invention was made with Government support under Grant No. NAG-3-2345, awarded by the National Aeronautics & Space Administration. The Government has certain rights in this invention.

BACKGROUND

1. Field of the Invention

Embodiments of the invention relate to jet engines, and more specifically, to jet engine noise suppression.

2. Description of Related Art

Aircraft noise has been a major problem in the aircraft industry. Among the sources of aircraft noise, jet engine noise is a dominant source. For commercial aircraft, the noise level becomes significant during both take-off and landing, causing concerns to local community near airports.

Current techniques to suppress jet engine noise have a number of drawbacks. Techniques relying on corrugated or fluted exhaust nozzles or additional passages connected to exhaust gas flow can only reduce some amount of noise at the expense of thrust loss and base drag increase. Other techniques do not provide satisfactory results or are not flexible to accommodate different engine operational modes in a typical aircraft flight route.

SUMMARY OF THE INVENTION

An embodiment of the invention is a technique to suppress noise in a jet engine. A substantially annular fan nozzle is attached to a pylon and discharges a fan stream into atmosphere from an aft end thereof. A core nozzle discharges core stream into the atmosphere. The core nozzle has an exterior surface. A stream director is mounted on the pylon to direct the fan stream away from the pylon. At least a portion of the stream director is situated outside the aft end to maintain substantially constant flow area of the fan nozzle.

BRIEF DESCRIPTION OF THE DRAWINGS

The invention may best be understood by referring to the following description and accompanying drawings that are used to illustrate embodiments of the invention. In the drawings.

DESCRIPTION

An embodiment of the invention is a technique to suppress noise in a jet engine. A substantially annular fan nozzle is attached to a pylon and discharges a fan stream into atmosphere from an aft end thereof. A core nozzle discharges core stream into the atmosphere. The core nozzle has an exterior surface. A stream director is mounted on the pylon to direct the fan stream away from the pylon. At least a portion of the stream director is situated outside the aft end to maintain substantially constant flow area of the fan nozzle.

In the following description, numerous specific details are set forth. However, it is understood that embodiments of the invention may be practiced without these specific details. In other instances, well-known circuits, structures, and techniques have not been shown in order not to obscure the understanding of this description.

Figure 1:
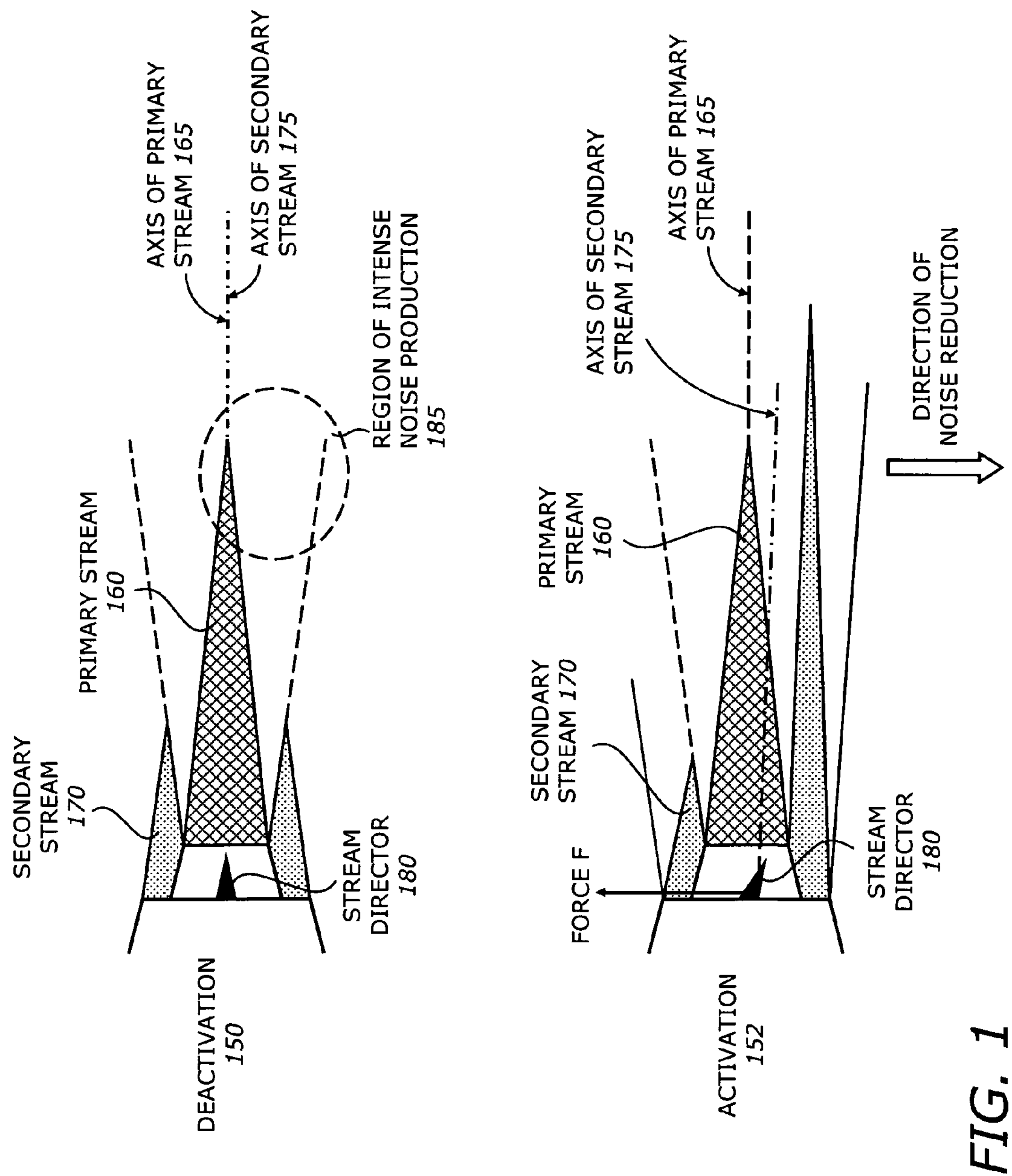
FIG. 1 is a diagram illustrating a basic principle of noise suppression according to one embodiment of the invention.

FIG. 1 is a diagram illustrating a basic principle of noise suppression according to one embodiment of the invention. The principle of noise suppression may be explained from a deactivation condition 150 and an activation condition 152. In this illustrative example, there are two air streams exhausted from an aircraft engine: a primary stream 160 and a secondary stream 170. The two streams may be discharged from two nozzles in a turbofan engine such as the fan and core nozzles.

The principle of noise suppression or reduction is based on a directional noise reduction method. In other words, noise is suppressed when the direction of the primary stream 160 or the secondary stream 170 is altered such that the slower secondary stream 170 is concentrated or forced adjacent to the faster primary stream 160 in the region where intense noise is generated and in a direction where noise reduction is desired. In a typical jet exhaust configuration at the exit of the jet engine, the primary stream 160 is a fast stream which forms around an axis 165 of primary stream, typically aligned with the center line of the engine core. The region around the end of the primary stream 160 is a region of intense noise production 185. In this region, high-speed primary stream 160 is very turbulent and jet noise emission is the most significant. The secondary stream 170 is typically slower than the primary stream 160 and forms around the start of the primary stream 160. The secondary stream 170 has an axis 175 of secondary stream. Suppose a stream director 180 is positioned at a location in the vicinity of the exit of the secondary nozzle and is substantially immersed in the secondary stream 170 exiting the nozzle.

In the deactivated mode 150, the stream director 180 is at the retracted position where it is substantially aligned with the axis 165 of the primary stream 160 which is substantially coaxial with the axis 175 of the secondary stream 170. In this condition, the primary and secondary streams 160 and 170 are substantially coaxial. In this configuration, the secondary stream 170 ends well upstream of the end of the primary stream 160 resulting in little or no noise suppression.

In the activation mode 152, the stream director 180 is at the extended position. The stream director generates a force F which causes a deflection of the secondary stream 170 so that the axis of the secondary stream 175 is no longer aligned with the axis 165 of the primary stream 160. The secondary stream 170 is deflected in the general direction where noise reduction is desired. In typical applications, this direction will be downward (towards the ground) and/or sideward. For the illustrative discussion that follows, the direction of noise reduction is taken to be downward. The force F induces a downward motion of the secondary flow so that the lower portion of the secondary flow is elongated. Moreover, the downward induction of secondary flow results in a layer of substantially unmixed flow around and downstream of the lower portion of the secondary stream 170. The result is that a layer of potential or substantially unmixed flow covers the region of intense noise production 185. In the vicinity of the region of intense noise production 185, the high-speed primary stream 160 and the layer of substantially unmixed flow form an eccentric configuration. This eccentric configuration causes noise suppression at the downward and sideward directions. The eccentricity of the high-speed primary flow and substantially unmixed secondary flow depends on the on the angle of deflection of the axis 175 of the secondary stream 170 relative to the axis 165 of the primary stream 160. Since the activation of the stream director 180 creates the force F that produces this deflection, the stream director 180 may be referred to as a force generator. FIG. 1 depicts a simplified version of this process wherein a unidirectional force F is shown. However, in general the force F may be a distributed force causing a distributed deformation of the secondary stream according to the range of directions in which noise suppression is desired.

Although the above discussion refers to two operating modes: the activation mode and the de-activation mode, the same principle may apply when the exhaust system operates only in the activation mode. In this situation, the stream director 190 may be fixed it its configuration or position.

Figure 2A:
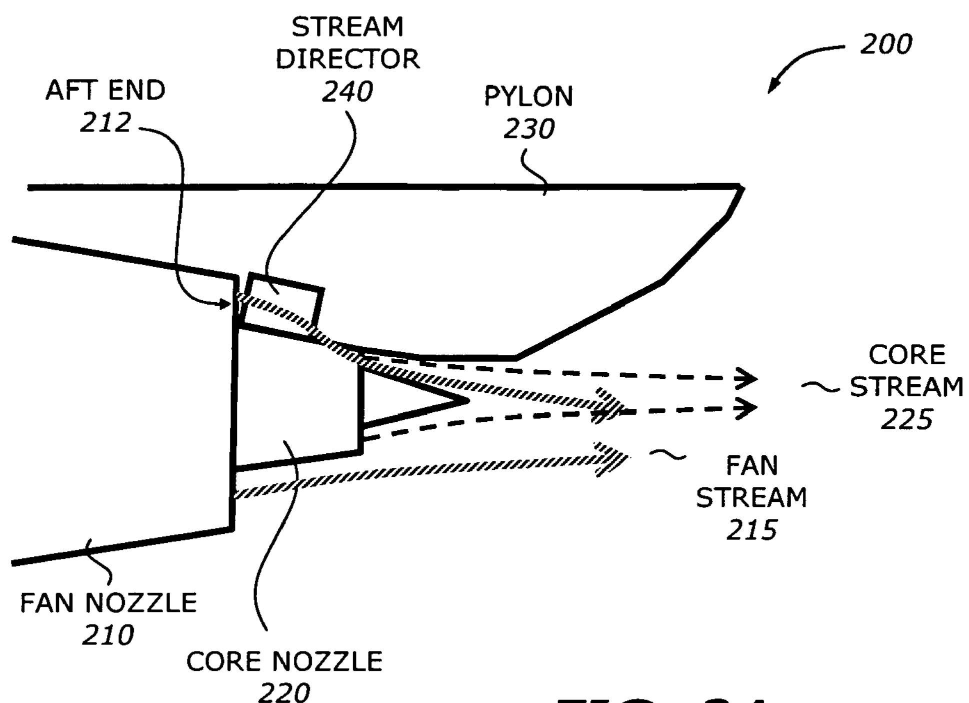
FIG. 2A is a diagram illustrating a side view of a noise suppression system according to one embodiment of the invention.

FIG. 2A is a diagram illustrating a side view of an exhaust system 200 according to one embodiment of the invention. The exhaust system 200 suppresses noise from an engine of an aircraft. The exhaust system 200 includes a substantially annular fan nozzle 210, a core nozzle 220, a mounting pylon 230, and a stream director 240.

The fan nozzle 210, the core nozzle 220, and the pylon 230 represent the well-known art of the exhaust of a separate-flow turbofan engine. The fan nozzle 210 and the core nozzle 220 are parts of a jet engine of an aircraft. The pylon 230 is a structural member that supports the engine on the wing or on the fuselage. For a wing-mounted engine, the pylon is substantially vertical. For a typical fuselage-mounted engine, the pylon is substantially horizontal. The pylon structure extends longitudinally from near the front of the engine to downstream of the core exhaust. The structure cuts through the fan nozzle 210 on the attachment side. Inside the fan nozzle 210, the pylon leading edge is located substantially upstream of the fan nozzle exit.

The fan nozzle 210 is attached to the pylon 230. It has an aft end 212. The fan nozzle 210 discharges a fan stream 215 into atmosphere from the aft end 212. The core nozzle 220 discharges a core stream 225 into the atmosphere. The core nozzle has an exterior surface 222. In normal operation, the fan stream 215 and the core stream 225 are substantially coaxial.

The stream director 240 operates essentially in the same principle as the stream director 180 shown in FIG. 1. It is attached or mounted on the pylon 230 to direct the fan stream 215 away from the pylon 230. As discussed above, the deflection of the fan stream 215 creates an eccentric configuration at substantially the sideward and/or downward direction. This is shown in FIG. 2A by illustrative streamlines of the fan stream 215 and core stream 225. Each portion of the stream director 240, on either side of the pylon 230, creates a force that directs the fan flow away from the pylon 230. Depending on the direction and distribution of this force, the movement of the fan stream 215 may be sideward and/or downward. The geometry of the exterior surface 222 may contribute to the downward motion of the fan stream 215 directed away from the pylon 230. For example, if the exterior surface 222 has a convergent shape, it may impart a downward motion to the sideward-deflected flow. In reference to the general principle of operation approximated in FIG. 1, the operation of the pylon-mounted deflector may be understood conceptually by considering only the lower halves of the deactivated 150 and activated 152 jet flows and by taking the direction of noise reduction to be the sideward direction. The resulting deformation of the air stream causes reduced velocity gradients, and ensuing reduction of the noise sources, in the general direction of the deformation. Additional noise reduction mechanisms may include refraction and convective Mach number reduction. At least a portion of the stream director 240 is situated outside the aft end 212 to maintain a substantially constant flow area of the fan nozzle 210. The leading edge of the stream director member 232 may be as far as about five exit heights downstream of the aft end 212 of the fan nozzle. The exit height H is the distance between the external surface 222 of the core nozzle 220 and the inner surface of the fan nozzle 210 at the aft end of the fan nozzle 212.

The stream director 240 includes a member 232, an actuator 234, and a controller 236. The stream director 240 may operate in a fixed mode or a variable mode. In the fixed mode, the position and/or the orientation of the member 232 is fixed according to some optimal criteria. In this mode, the controller 236 and/or the activator 234 may not be needed and the stream director 240 may include only then member 232. In the variable mode, the position and/or the movement of the member 232 is variable or changed, either manually or automatically, according to the desired level of noise suppression.

The member 232 may be attached to either side of the pylon 230 to cause the fan stream 215 to deflect away from the pylon 230. The member 232 may have a fixed or variable position on the pylon 230.

At a cross-plane downstream of the location of the stream director 240, the velocity profile without stream director is largely symmetric (e.g., concentric or coaxial) around the axis of the nozzle. When the stream director 240 is activated, the velocity profile becomes deformed and asymmetric (e.g., non-concentric or eccentric), with reduced gradients in the general direction where noise reduction is desired. In most civilian applications, the general direction of the deformation, and of the resulting noise suppression, is downward and to the sideline. In a wing-mounted engine with vertical pylon, the stream director 240 may be applied symmetrically on both sides of the pylon 230 to cause deformation of the fan stream 215 in the sideline and downward directions. In a fuselage-mounted engine with a horizontal pylon, the stream director 240 may be applied to only the bottom side of the pylon 230 to cause a downward deformation of the fan stream 215.

In all embodiments, the stream director 240 is located substantially or totally outside the exit of the fan duct. This allows a substantially constant flow area of the fan nozzle 210 and thus prevents alterations to the engine cycle that would have resulted from significant changes in the flow area. Moreover, the placement of the stream director 240 on the pylon 230 and substantially outside the fan nozzle 210 means that this noise suppression system requires changes only to the pylon 230 and that the nozzles 210 and/or 220 may not require any modifications.

The actuator 234 is coupled to the member 232 to activate the member 232 when the member 232 has the variable or adjustable position. When activated, the member 232 directs the fan stream 215 away from the pylon 230. The controller 236 is coupled to the actuator 234 to control the actuator 234 to activate or de-activate the member 232. The controller 236 may be located on the engine 130 or at a distance from the engine 130 such as in the frame of the wing 120, the pylon 230, or any other suitable location. The controller 112 receives control signals either from the flight crew (e.g., pilot, flight engineer), from a prescribed control sequence, or from an automatic sensing instrument. The prescribed control sequence may be such as to maximize noise reduction at each monitoring/certification point or to maximize the cumulative noise reduction at all monitoring/certification points; such monitoring/certification points include the sideline, takeoff/cutback, and approach monitors. The controller 112 generates control signals to the actuator 234 to activate or deactivate the stream director 240. The actuator 234 may activate the member 232 using at least one of pneumatic, hydraulic, mechanical, electrical, and electromagnetic action or a valve. The action controls the movement of the stream director 232 into two positions: a retracted position and an extended position. The actuator 234 and/or the stream director 232 may be fabricated, in part or in full, using a shape-memory alloy that is activated by electricity or by the temperature of the fan flow. Any alloy that possesses the shape-memory property, i.e., the ability to remember the original shapes, may be used. Examples of shape-memory alloys include nickel-titanium, copper-aluminum, copper-zinc-aluminum, and iron-manganese-silicon alloys. Use of a shape-memory alloy activated by the temperature of the fan air would enable autonomous operation of the stream director 232 thus obviating the use of the controller 236.

The retracted position of the member 232 corresponds to a deactivated condition or to the position of the member 232 where the fan stream 215 is not directed away from the pylon. The extended position of the member 232 corresponds to an activated condition or to the position of the member 232 that directs fan stream away from the pylon 230. The activated position may be prescribed to optimally provide noise reduction monitored at a particular monitoring station and may not necessarily correspond to the full deployment of the member 232. Intermediate positions may be defined to allow a gradual movement of the member 232. The member 232 may be a flap, prism, or a fluid injector. When the member 232 is a fluid injector, the term retracted position corresponds to a closed position where the fluid injector stops or reduces injecting the fluid, and the term extended position corresponds to an open position where the fluid injector injects or increases injecting the fluid.

Figure 2B:
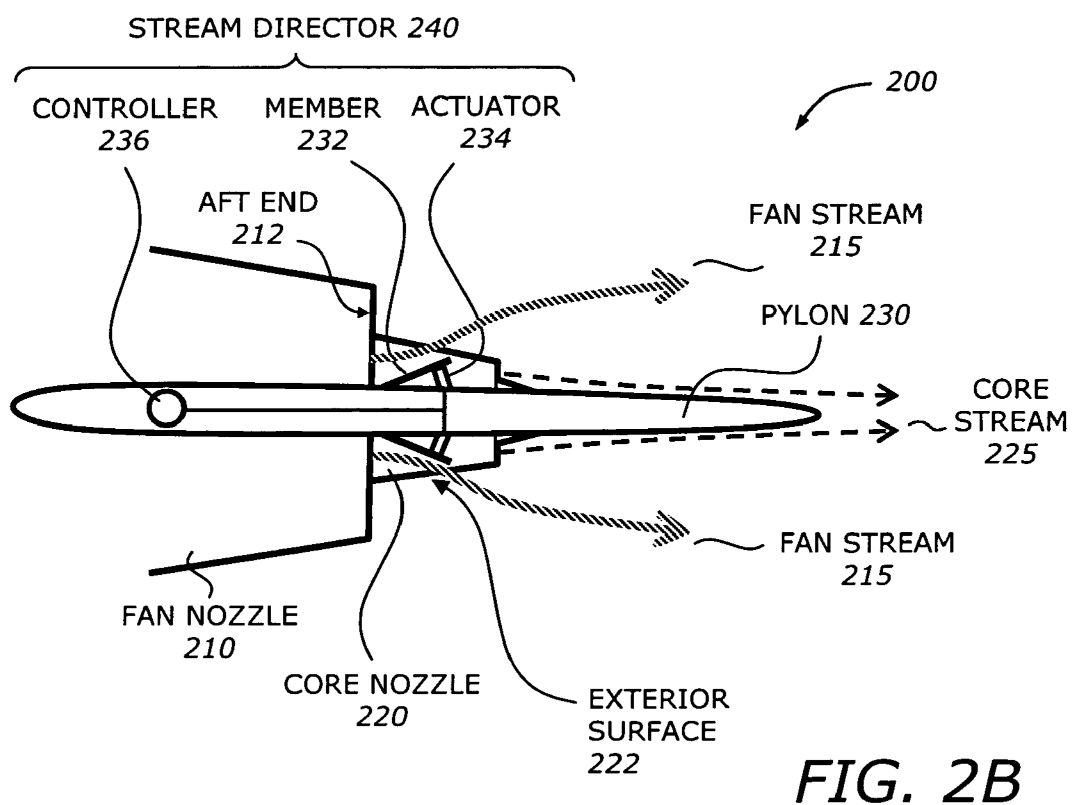
FIG. 2B is a diagram illustrating a top view of a noise suppression system according to one embodiment of the invention.

FIG. 2B is a diagram illustrating a top view of the noise suppression system 200 according to one embodiment of the invention.

The member 232 may include at least one flap on either side of the pylon 230. The flap 232 makes an acute angle with the direction of the fan stream 215 and directs the fan stream 215 away from the pylon 230. This angle may range from zero to 60 degrees. The flap length may range from 1.0 to 4.0 exit heights H, and the flap height may range from 0.75 to 2.0 exit heights H. The flap 232 may include a rigid plate or a flexible plate. The plate may be straight or curved. For a rigid plate, the flap 232 may be hinged at its leading edge. For a flexible plate, the flap may be cantilevered around its leading edge. Further, for a flexible plate, the actuator 234 may be arranged to impart longitudinal and/or transverse curvature to the flap surface. As discussed above, activation of the flap 232 may include pneumatic, hydraulic, or mechanical actuation. Further, the actuator 234 or the flap member 232 may be fabricated, in part or in full, by a shape-memory alloy that is activated by electricity or by the temperature of the fan flow. Two flaps, one on either side of the pylon, may be used. Alternatively, only one flap may be used. The angle of the flap 232 with the pylon 230 is controlled by the actuator 234. In the deactivated position, the flap 232 may be flush with the surface of the pylon 230 to eliminate aerodynamic disturbances. This can be accomplished by the surface of the pylon 230 having a recess where the flap 232 is stored; alternatively, the skin of the pylon 230 may be used to form the flap 232.

Figure 2C:
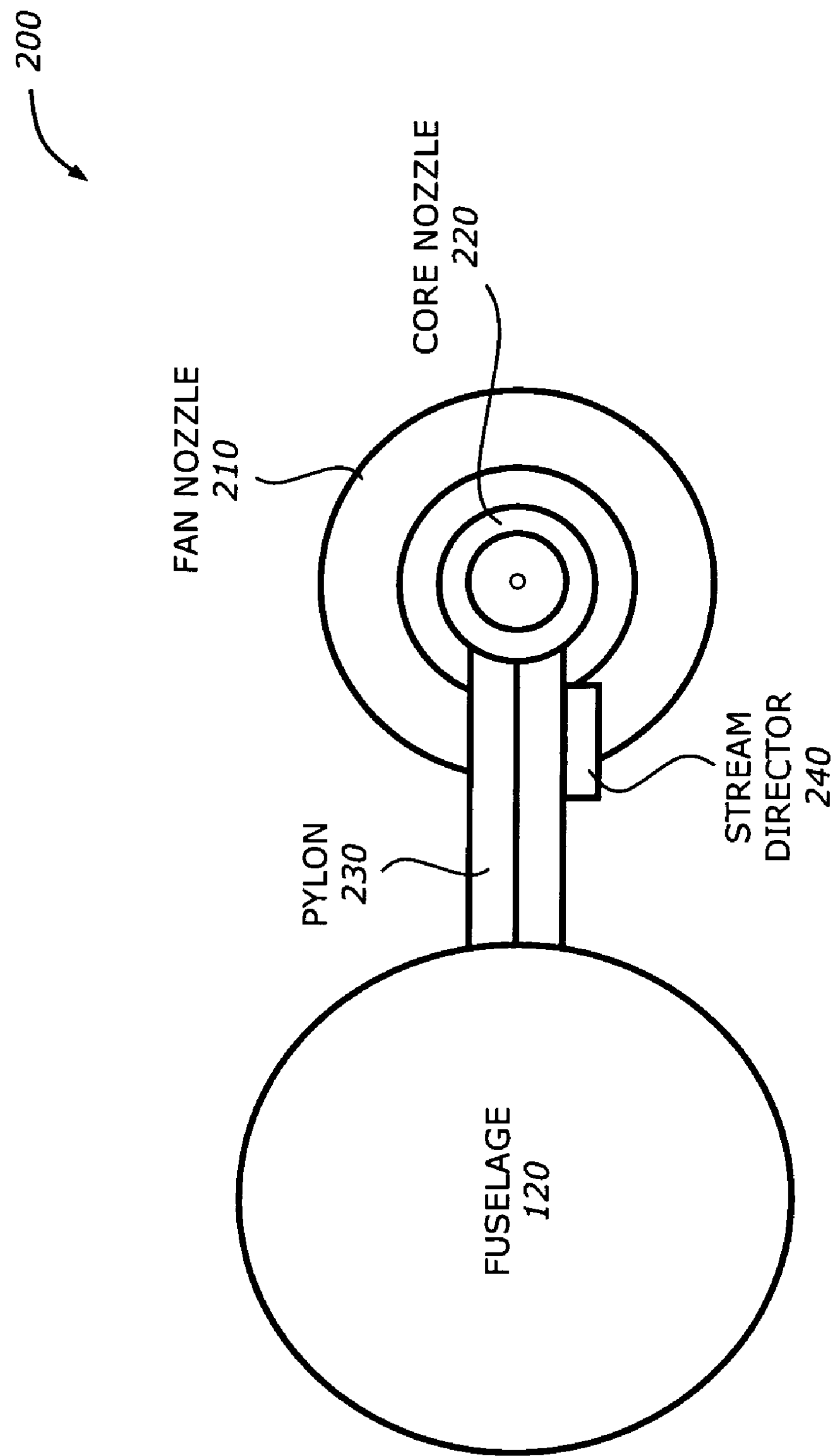
FIG. 2C is a diagram illustrating a rear view of a noise suppression system with a horizontal pylon according to one embodiment of the invention.

FIG. 2C is a diagram illustrating a rear view of the noise suppression system 200 with a horizontal pylon according to one embodiment of the invention.

The pylon 230 attached the fan nozzle 210 and/or the core nozzle 220 to a fuselage 120 in a horizontal plane. In this configuration, the stream director 240 is typically attached to the bottom surface of the pylon 230.

Figure 3:
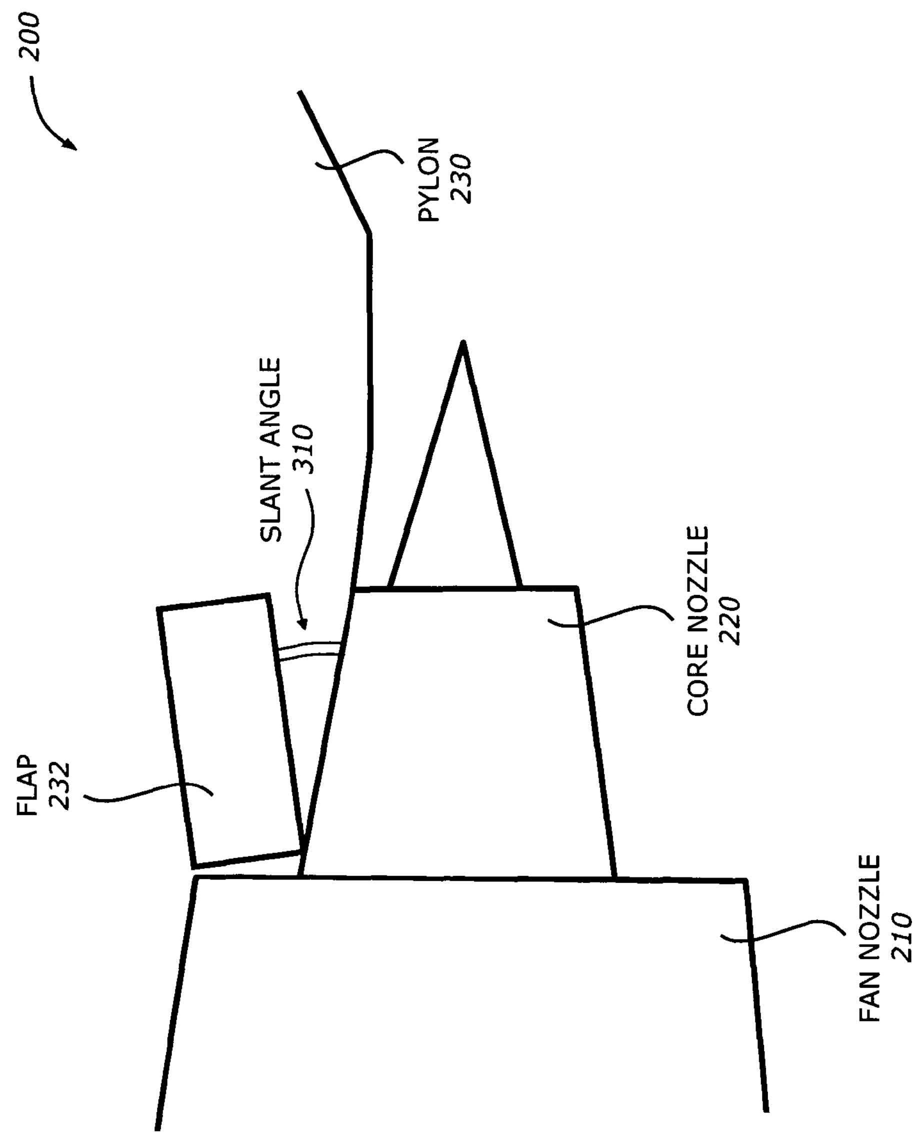
FIG. 3 is a diagram illustrating a stream director having flap forming a slant angle with air direction according to one embodiment of the invention.

FIG. 3 is a diagram illustrating a stream director having flap forming a slant angle with the direction of the fan stream according to one embodiment of the invention.

The stream director 240 includes a flap member 232 placed at a slant angle 310 relative to the direction of the fan stream 215. The slant angle may be fixed or controlled by the actuator 234. For a vertical pylon 230, the slant angle 310 may control the amount of the fan stream 215 that is directed downward. The slant angle 310 may range from zero to 45 degrees. A large slant angle 310 result in a large movement of air deflected downward.

Figure 4:
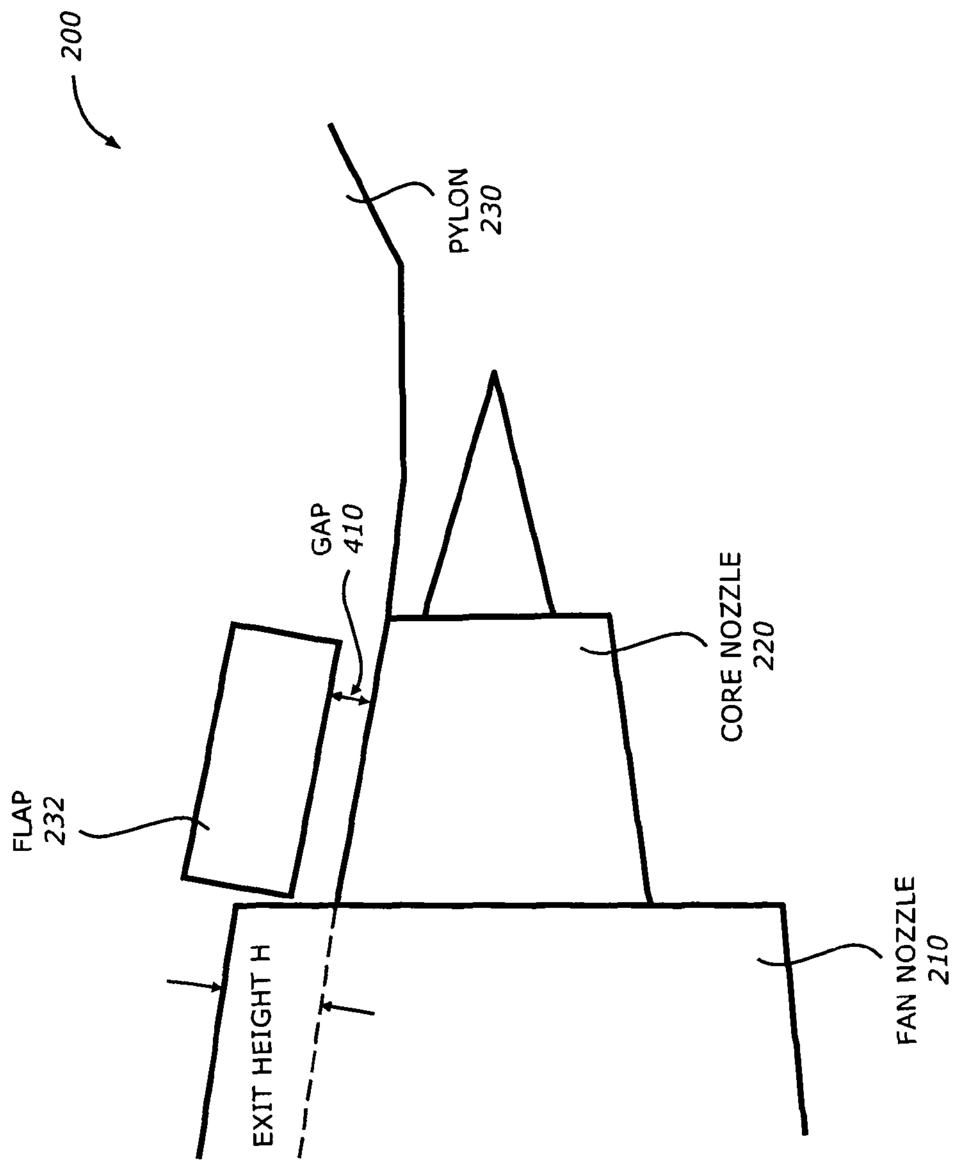
FIG. 4 is a diagram illustrating a stream director having flap forming a gap with the surface of the core nozzle according to one embodiment of the invention.

FIG. 4 is a diagram illustrating a stream director having flap forming a gap with the surface of the core nozzle according to one embodiment of the invention.

The stream director 240 includes of a flap member 232 that has a gap 410 between the bottom edge of the flap 232 and the surface of the core nozzle 220. The gap allows some fan air of the fan stream 215 on the top of the core nozzle 220 thus preventing generation of steep velocity gradients on the top of the jet exiting the core nozzle 220 that may cause an increase in upward-generated noise. The height of the gap 410, as a fraction of an exit height H of the annular fan nozzle 210, may be the result of optimization but is expected to range approximately from 10% to 50% of the exit height H. In applications where a good seal is desired between the bottom edge of the flap 232 and the surface of the core nozzle 220, the gap 410 may be zero.

Figure 5A:
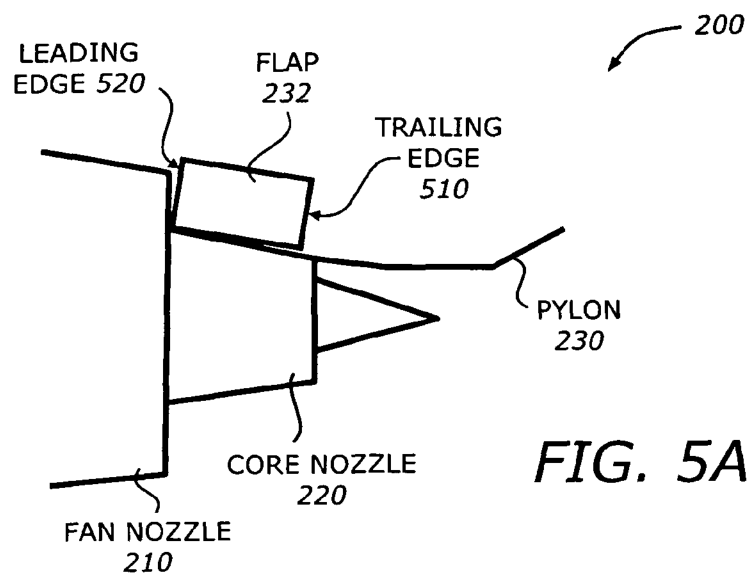
FIG. 5A is a diagram illustrating a side view of a stream director having flap with a trailing edge angled with the pylon surface according to one embodiment of the invention.
Figure 5B:
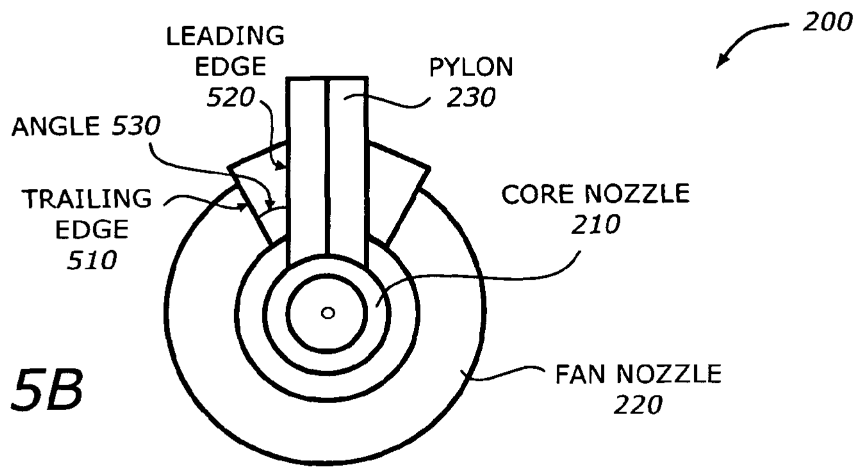
FIG. 5B is a diagram illustrating a top view of a stream director having flap with a trailing edge angled with the pylon surface according to one embodiment of the invention.

FIGS. 5A and 5B are diagrams illustrating a side view and a top view, respectively, of a stream director having flap with a trailing edge angled with the pylon surface according to one embodiment of the invention.

The stream director 240 includes of a flap member 232 that has a trailing edge 510 and a leading edge 520. The trailing edge 510 of the flap member 232 forms an angle 530 with the surface of the pylon 230. Such arrangement may be achieved by using a flexible plate that has a twist so that the leading edge 520 of the flap 232 is aligned with the surface of the pylon 230 and the trailing edge of the flap 232 forms the angle 530 with the surface of the pylon 230. The angle 530 of the trailing edge 510 may control the amount of air that is deflected downward. The angle 530 may range from zero to 45 degrees.

Figure 6:
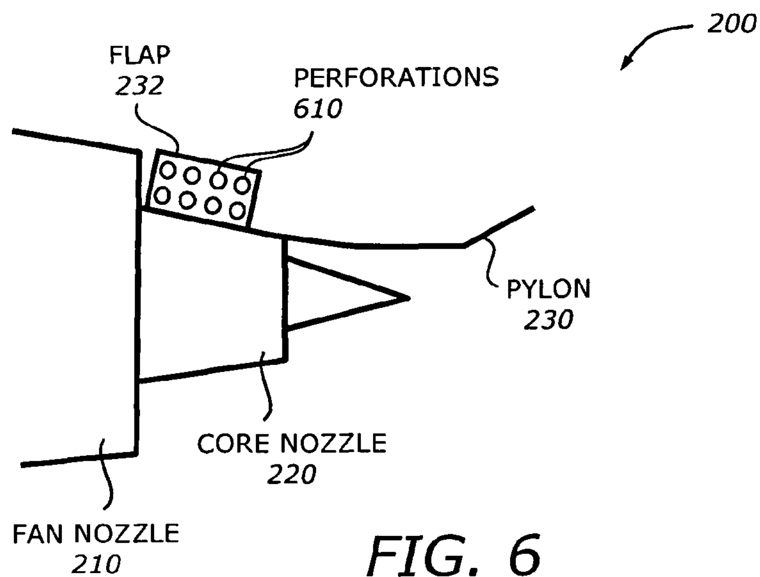
FIG. 6 is a diagram illustrating a stream director with perforations according to one embodiment of the invention.

FIG. 6 is a diagram illustrating a stream director with perforations according to one embodiment of the invention.

The stream director 240 includes a flap member 232 with perforations. The perforations may reduce aerodynamic buffet that could occur when the flap 232 is deployed at significant angles. Additionally, the perforations allow some fan air through the flap 232 thus preventing generation of steep velocity gradients on the top of the jet exiting the core nozzle that could cause increase in upward-generated noise. The perforations may be circular, elliptical, or of other suitable shape. The percent of open area of the perforated flap 232 will be the result of optimization but is expected to range approximately from 20% to 70% of the total area of the flap 232.

Figure 7A:
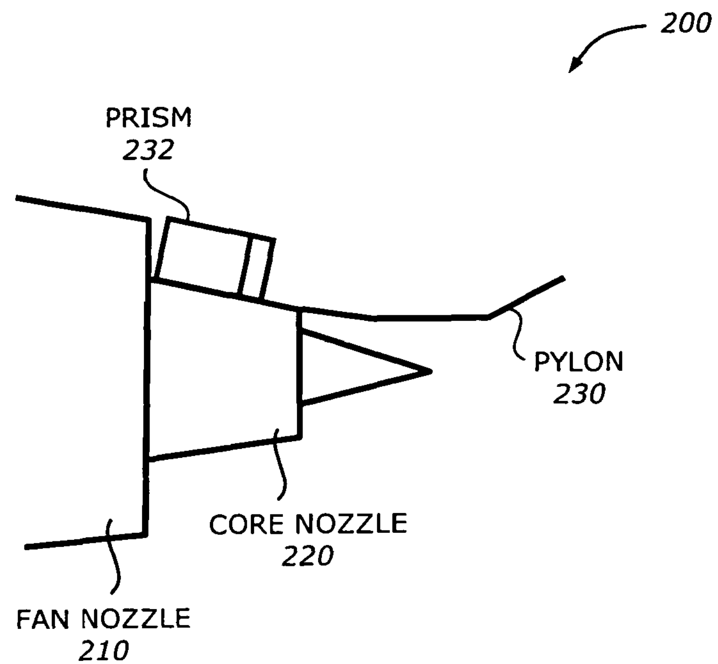
FIG. 7A is a diagram illustrating a side view of a stream director with a triangular prism according to one embodiment of the invention.
Figure 7B:
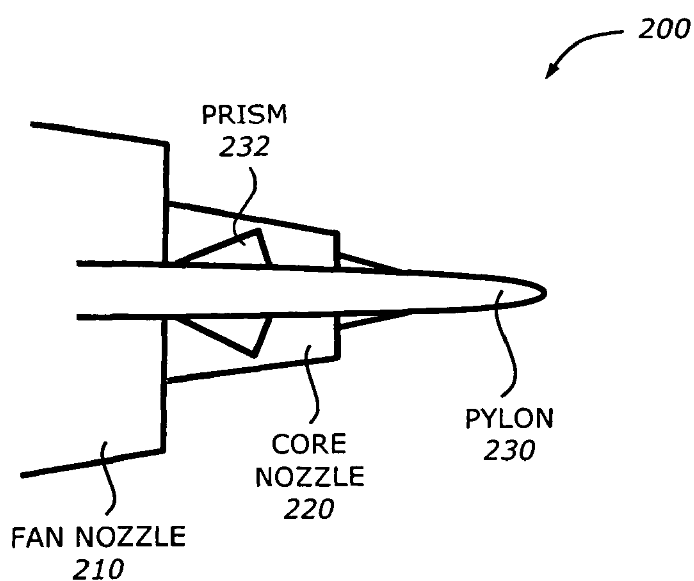
FIG. 7B is a diagram illustrating a top view of a stream director with a triangular prism according to one embodiment of the invention.

FIGS. 7A and 7B are diagrams illustrating a side view and a top view, respectively, of a stream director with a triangular prism according to one embodiment of the invention.

The stream director 240 includes a member 232 having the shape of a triangular prism. The fore joining face of the prism 232 makes an acute angle with direction of the fan stream. The angle of the aft joining face may be determined by optimization that minimizes the drag of the prism 232. The prism 232 may be hollow and devoid of base faces. Similar to the flap configurations shown in FIGS. 3, 4, 5A, 5B, 6A, and 6B, the prism 232 may make a slant angle, leave a gap between its lower edge and the surface of the core nozzle 220, have a twisted front joining surface, and/or have perforations.

Figure 8A:
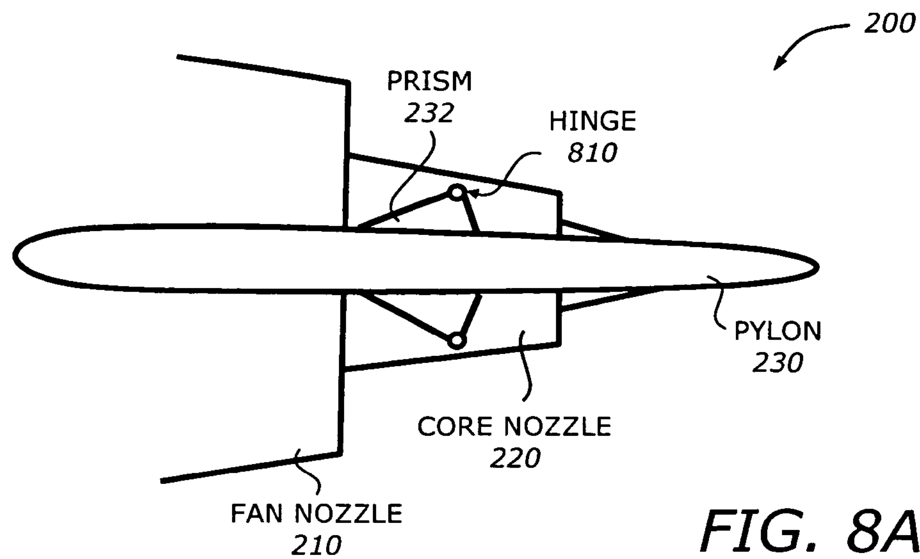
FIG. 8A is a diagram illustrating a top view of a stream director with a triangular prism in activation mode according to one embodiment of the invention.

FIG. 8A is a diagram illustrating a top view of a stream director with a triangular prism in activation mode according to one embodiment of the invention.

The stream director 240 includes a member 232 having the shape of a triangular prism. The prism 232 may be hollow and devoid of base surfaces. The joint of fore and aft surfaces may be hinged at a hinge 810. The hinge 810 allows for the prism 232 to change shape.

Figure 8B:
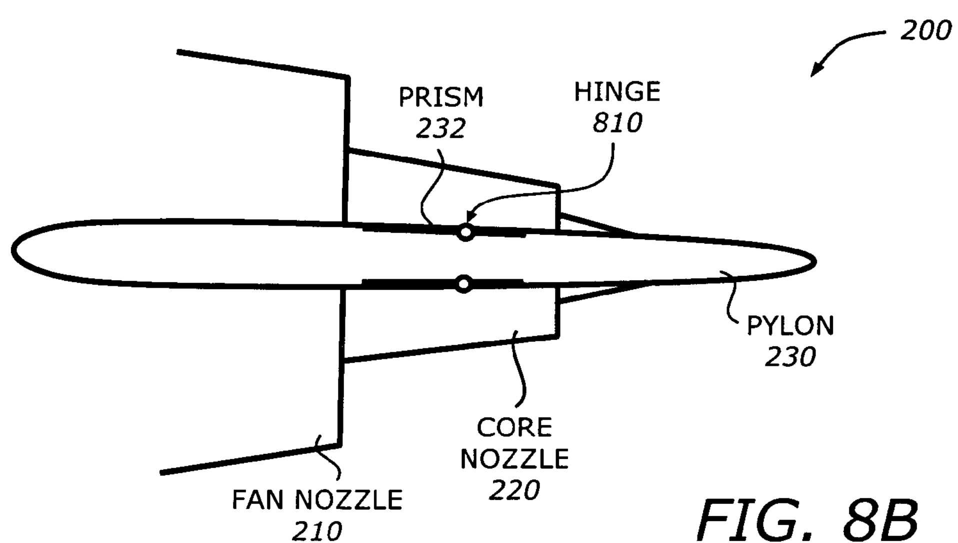
FIG. 8B is a diagram illustrating a top view of a stream director with a triangular prism in de-activation mode according to one embodiment of the invention.

FIG. 8B is a diagram illustrating a top view of a stream director with a triangular prism in de-activation mode according to one embodiment of the invention.

The hinge 810 allows for unfolding of the surface of the prism 232 onto the surface of the pylon 230 when the prism 232 is deactivated. In the de-activation mode, the surface of the prism 232 may be substantially flat resting on the surface of the pylon 230.

Figure 9:
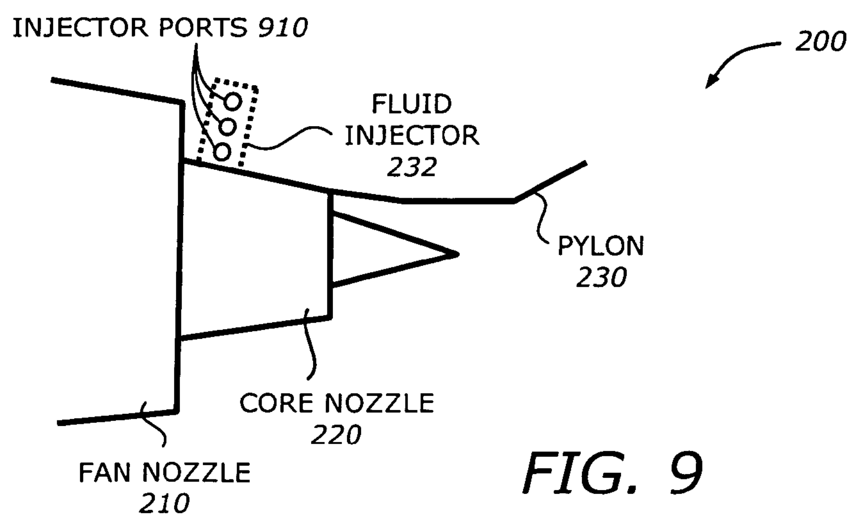
FIG. 9 is a diagram illustrating a stream director with injection ports according to one embodiment of the invention.

FIG. 9 is a diagram illustrating a stream director with injection ports according to one embodiment of the invention.

The stream director 240 includes member 232 having injection ports through which a fluid is injected. A single port or a multitude of ports may be used. The ports may be arranged in a vertical pattern, or other patterns depending on the desired displacement of the fan stream and the mechanical structure of the pylon 230. The ports may include circular holes, elliptical holes, slots, or any other suitable orifice. The injection would be activated during noise-sensitive segments of flight and deactivated otherwise. The injection fluid may be air from a compressor stage of the engine, air from a fan stage of the engine, or a compressed gas or liquid stored onboard the aircraft. The injection may be controlled by pressure regulators and by on/off valve. The typical injection mass flow rate may be a small fraction (e.g., in the order of 10% or less) of the mass flow rate of the air flowing through the engine compressor.

Figure 10A:
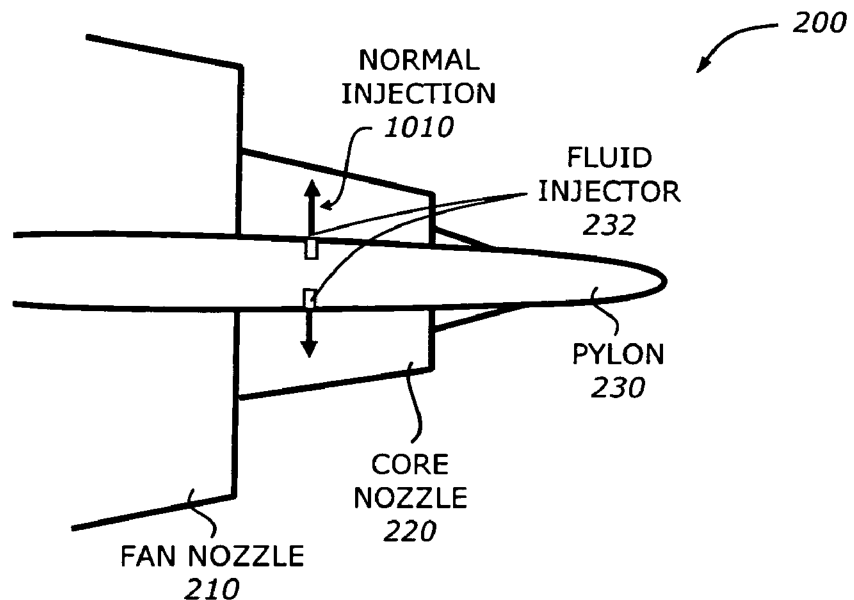
FIG. 10A is a diagram illustrating a stream director with a normal fluid injection according to one embodiment of the invention.
Figure 10B:
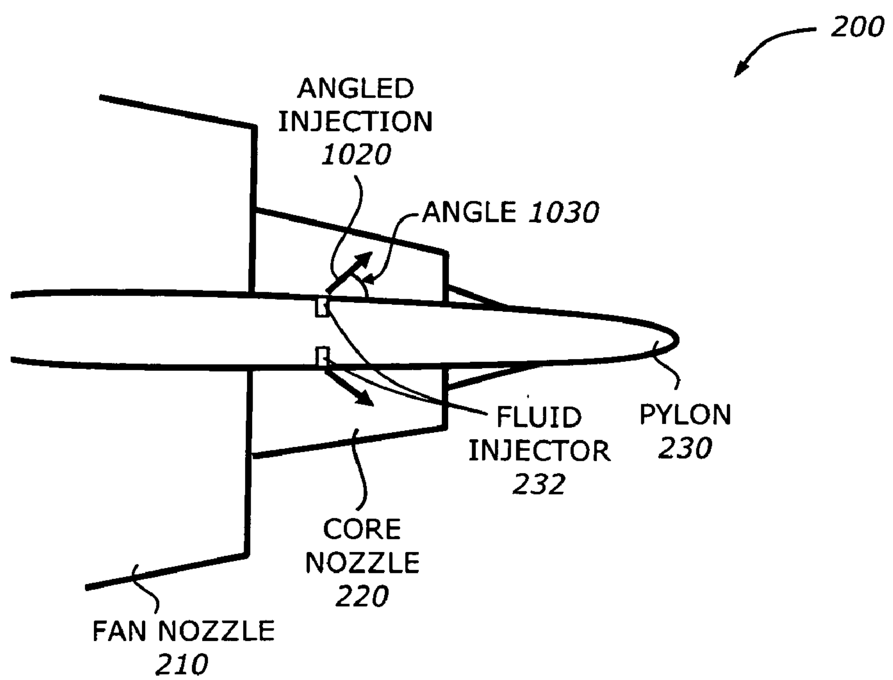
FIG. 10B is a diagram illustrating a stream director with an angled fluid injection according to one embodiment of the invention.

FIGS. 10A and 10B are diagrams illustrating a stream director with a normal and angled, respectively, fluid injection according to one embodiment of the invention.

The injection 1010 may be normal, or substantially perpendicular, to the direction of the fan stream 215.

The injection 1020 may be at an angle acute to the direction of the fan stream. The injection angle would be the result of optimization that includes the parameters of displacement of the fan stream away of the pylon 230 and the forward thrust of the injectors. The acute angle may be from 20 degrees to less than 90 degrees.

Figure 11:
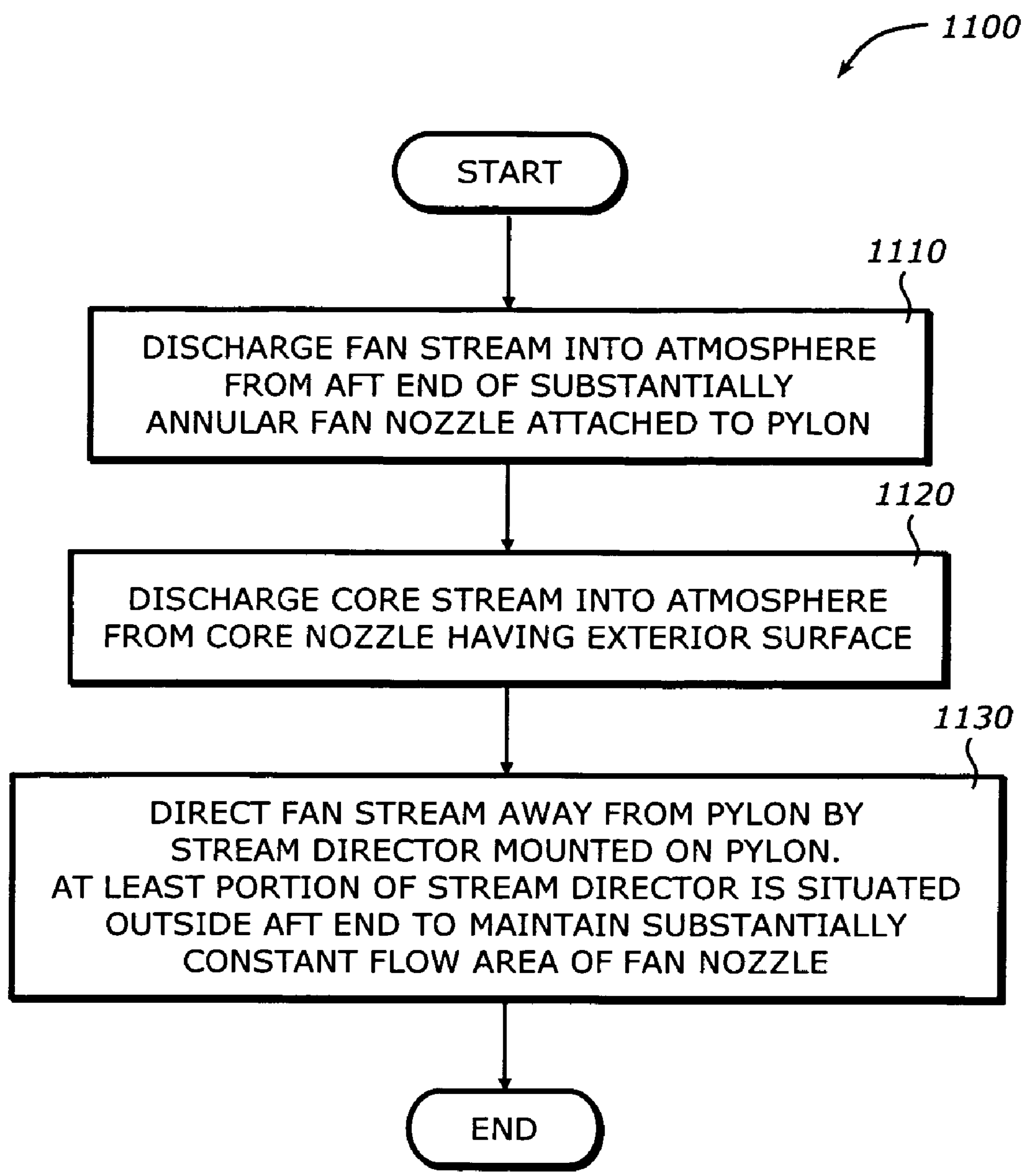
FIG. 11 is a flowchart illustrating a process to suppress noise according to one embodiment of the invention.

FIG. 11 is a flowchart illustrating a process 1100 to suppress noise according to one embodiment of the invention.

Upon START, the process 1100 discharges a fan stream into atmosphere from an aft end of a substantially annular fan nozzle attached to a pylon (Block 1110). Next, the process 1100 discharges a core stream into the atmosphere from a core nozzle having an exterior surface (Block 1120).

Then, the process 1100 directs the fan stream away from the pylon by a stream director mounted on the pylon (Block 1130). At least a portion of the stream director is position or situated outside the aft end to maintain substantially constant flow area of the fan nozzle. This may be performed by causing the fan stream to deflect away from the pylon by a member of the stream director that is attached to either side of the pylon. The member may have a fixed or variable position on the pylon. The member may be a flap, a prism, or a fluid injector as described above.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A turbofan exhaust system comprising:

a substantially annular fan nozzle attached to a pylon and discharging fan stream into atmosphere from an aft end thereof;

a core nozzle to discharge core stream into the atmosphere, the core nozzle having an exterior surface; and a stream director mounted on the pylon substantially external to the fan nozzle directing the fan stream away from the pylon, at least a portion of the stream director situated outside the aft end to maintain substantially constant flow area of the fan nozzle.

2. The turbofan exhaust system of claim 1 wherein the stream director comprises:

a member attached to either side of the pylon to cause the fan stream to deflect away from the pylon, the member having a fixed or variable position on the pylon.

3. The turbofan exhaust system of claim 2 wherein the stream director further comprises:

an actuator coupled to the member to activate the member having the variable position, the activated member directing the fan stream away from the pylon; and a controller coupled to the actuator to control the actuator to activate or de-activate the member.

4. The turbofan exhaust system of claim 3 wherein the actuator activates the member using at least one of pneumatic, hydraulic, mechanical, electrical, and electromagnetic action.

5. The turbofan exhaust system of claim 2 wherein the member comprises a flap forming an acute angle with a pylon surface or direction of the fan air when activated, the flap being flush with the pylon surface when de-activated.

6. The turbofan exhaust system of claim 2 wherein the member comprises a flap forming a slant angle relative to direction of the fan stream.

7. The turbofan exhaust system of claim 2 wherein the member comprises a flap forming a gap with respect of the exterior surface of the core nozzle.

8. The turbofan exhaust system of claim 2 wherein the member comprises a flap having a trailing edge and a leading edge, the leading edge being aligned with surface of the pylon and the trailing edge forming an acute angle with the surface of the pylon.

9. The turbofan exhaust system of claim 2 wherein the member comprises a flap having a perforated surface.

10. The turbofan exhaust system of claim 2 wherein the member comprises a triangular prism having a fore joining face making an acute angle with direction of the fan stream.

11. The turbofan exhaust system of claim 10 wherein the prism is hollow or hollow and devoid of base faces.

12. The turbofan exhaust system of claim 2 wherein the member comprises a fluid injector.

13. The turbofan exhaust system of claim 12 wherein the fluid injector comprises at least one injection port on surface of the pylon, the injection port injecting air from a compressor stage or a fan stage of a turbofan.

14. The turbofan exhaust system of claim 12 wherein the fluid injector injects a fluid at an angle normal or acute to direction of the fan stream.

15. The turbofan exhaust system of claim 2 wherein the member or the actuator is fabricated by a shape-memory alloy and is activated by an electric excitation or temperature of the fan stream.

16. A method comprising:

discharging fan stream into atmosphere from an aft end of a substantially annular fan nozzle attached to a pylon;

discharging core stream into the atmosphere from a core nozzle having an exterior surface; and directing the fan stream away from the pylon by a stream director mounted on the pylon substantially external to the fan nozzle, at least a portion of the stream director being situated outside the aft end to maintain substantially constant flow area of the fan nozzle.

17. The method of claim 16 wherein directing the fan stream comprises:

causing the fan stream to deflect away from the pylon by a member of the stream director that is attached to either side of the pylon, the member having a fixed or variable position on the pylon.

18. The method of claim 17 wherein directing the fan stream further comprises:

activating the member having the variable position by an actuator, the activated member directing the fan stream away from the pylon; and controlling the actuator to activate or de-activate the member.

19. The method of claim 18 wherein activating comprises activating the member using at least one of pneumatic, hydraulic, mechanical, electrical, and electromagnetic action.

20. The method of claim 18 wherein activating the member comprises activating a flap forming an acute angle with a pylon surface or direction of the fan air when activated, the flap being flush with the pylon surface when de-activated.

21. The method of claim 18 wherein activating the member comprises activating a flap forming a slant angle relative to direction of the fan stream.

22. The method of claim 18 wherein activating the member comprises activating a flap forming a gap with respect of the exterior surface of the core nozzle.

23. The method of claim 18 wherein activating the member comprises activating a flap having a trailing edge and a leading edge, the leading edge being aligned with surface of the pylon and the trailing edge forming an acute angle with the surface of the pylon.

24. The method of claim 18 wherein activating the member comprises activating a flap having a perforated surface.

25. The method of claim 18 wherein activating the member comprises activating a triangular prism having a fore joining face making an acute angle with direction of the fan stream.

26. The method of claim 25 wherein the prism is hollow or hollow and devoid of base faces.

27. The method of claim 18 wherein activating the member comprises activating a fluid injector.

28. The method of claim 27 wherein the fluid injector comprises at least one injection port on surface of the pylon, the injection port injecting air from a compressor stage or a fan stage of a turbofan.

29. The method of claim 27 wherein activating the fluid injector comprises injecting a fluid at an angle normal or acute to direction of the fan stream.

30. The method of claim 18 wherein the member or the actuator is fabricated by a shape-memory alloy and is activated by an electric excitation or temperature of the fan stream.

31. A system comprising:

a pylon;

a jet engine attached to the pylon, comprising:

a substantially annular fan nozzle to discharge fan stream into atmosphere from an aft end thereof; and a core nozzle to discharge core stream into the atmosphere, the core nozzle having an exterior surface, and a stream director mounted on the pylon substantially external to the fan nozzle directing the fan stream away from the pylon, at least a portion of the stream director situated outside the aft end to maintain substantially constant flow area of the fan nozzle.

32. The system of claim 31 wherein the stream director comprises:

a member attached to either side of the pylon to cause the fan stream to deflect away from the pylon, the member having a fixed or variable position on the pylon.

33. The system of claim 32 wherein the stream director further comprises:

an actuator coupled to the member to activate the member having the variable position, the activated member directing the fan stream away from the pylon; and a controller coupled to the actuator to control the actuator to activate or de-activate the member.

34. The system of claim 33 wherein the actuator activates the member using at least one of pneumatic, hydraulic, mechanical, electrical, and electromagnetic action.

35. The system of claim 32 wherein the member comprises a flap forming an acute angle with a pylon surface or direction of the fan air when activated, the flap being flush with the pylon surface when de-activated.

36. The system of claim 32 wherein the member comprises a flap forming a slant angle relative to direction of the fan stream.

37. The system of claim 32 wherein the member comprises a flap forming a gap with respect of the exterior surface of the core nozzle.

38. The system of claim 32 wherein the member comprises a flap having a trailing edge and a leading edge, the leading edge being aligned with surface of the pylon and the trailing edge forming an acute angle with the surface of the pylon.

39. The system of claim 32 wherein the member comprises a flap having a perforated surface.

40. The system of claim 32 wherein the member comprises a triangular prism having a fore joining face making an acute angle with direction of the fan stream.

41. The system of claim 40 wherein the prism is hollow or hollow and devoid of base faces.

42. The system of claim 32 wherein the member comprises a fluid injector.

43. The system of claim 42 wherein the fluid injector comprises at least one injection port on surface of the pylon, the injection port injecting air from a compressor stage or a fan stage of a turbofan.

44. The system of claim 42 wherein the fluid injector injects a fluid at an angle normal or acute to direction of the fan stream.

45. The system of claim 32 wherein the member or the actuator is fabricated by a shape-memory alloy and is activated by an electric excitation or temperature of the fan stream.

* * * * *